United States Patent
Gakh

(10) Patent No.: US 12,183,895 B2
(45) Date of Patent: Dec. 31, 2024

(54) SECONDARY CARBON BATTERY

(71) Applicant: Andrei A. Gakh, Bethesda, MD (US)

(72) Inventor: Andrei A. Gakh, Bethesda, MD (US)

(*) Notice: Subject to any disclaimer, the term of this patent is extended or adjusted under 35 U.S.C. 154(b) by 144 days.

(21) Appl. No.: 17/877,921

(22) Filed: Jul. 30, 2022

(65) Prior Publication Data

US 2024/0039054 A1 Feb. 1, 2024

(51) Int. Cl.
| | |
|---|---|
| *H01M 4/66* | (2006.01) |
| *H01M 4/04* | (2006.01) |
| *H01M 4/58* | (2010.01) |
| *H01M 4/583* | (2010.01) |
| *H01M 10/38* | (2006.01) |
| *H01M 10/42* | (2006.01) |
| *H01M 50/609* | (2021.01) |
| *H01M 4/02* | (2006.01) |

(52) U.S. Cl.
CPC ......... *H01M 10/38* (2013.01); *H01M 4/0447* (2013.01); *H01M 4/583* (2013.01); *H01M 4/663* (2013.01); *H01M 10/4214* (2013.01); *H01M 50/609* (2021.01); *H01M 2004/021* (2013.01); *H01M 2300/0002* (2013.01)

(58) Field of Classification Search
CPC .. H01M 10/38; H01M 50/609; H01M 4/0447; H01M 4/583; H01M 4/663
See application file for complete search history.

(56) References Cited

U.S. PATENT DOCUMENTS

| | | | |
|---|---|---|---|
| 2,800,616 A | 7/1957 | Becker | |
| 3,652,902 A | 3/1972 | Hart et al. | |
| 4,622,611 A | 11/1986 | Bennett et al. | |
| 4,713,731 A | 12/1987 | Boos et al. | |
| 5,476,734 A * | 12/1995 | Pulley | H01M 4/64 429/240 |
| 6,706,079 B1 | 3/2004 | Shmatko et al. | |
| 7,119,047 B1 | 10/2006 | Adrianov et al. | |
| 8,451,585 B2 | 5/2013 | Quinliven | |
| 2009/0253025 A1 * | 10/2009 | Whitacre | H01G 11/86 429/188 |

(Continued)

OTHER PUBLICATIONS

He, M., et al. "Ageing phenomena in high-voltage aqueous supercapacitors investigated by in situ gas analysis." Energy & Environmental Science, 2016, V. 9, No. 2, pp. 623-633.

(Continued)

*Primary Examiner* — Kenneth J Douyette

(57) ABSTRACT

Secondary carbon batteries are attractive from an environmental perspective, as they have carbon-only electrodes and are therefore metal-free. Current invention refers to novel secondary carbon batteries with water-based brine electrolytes. These electrolytes have low toxicity, are not flammable, and allow for easy on-site battery recycling. The inventive carbon batteries feature graphite current collectors, activated carbon electrodes, and aqueous eutectic electrolytes comprising NaCl, KCl, $MgCl_2$, or $CaCl_2$). Further improvement of the batteries is performed by an initial repetitive charge-discharge cycling with subsequent replacement of the spent electrolyte. The improved secondary carbon batteries with the operating voltage of about 1.8 V can be used for electric storage utilities of renewable energy installations.

6 Claims, 3 Drawing Sheets

(56) References Cited

U.S. PATENT DOCUMENTS

2011/0159381 A1* 6/2011 Doe .................. H01M 4/13
                                              429/219
2011/0206959 A1* 8/2011 Suppes ............ H01M 4/0452
                                              429/247

OTHER PUBLICATIONS

Kopczyński, K., et al. "Persulfate treatment as a method of modifying carbon electrode material for aqueous electrochemical capacitors." Journal of Solid State Electrochemistry, 2017, V. 21, No. 4, pp. 1079-1088.
Gou, Q., et al. "Recent advances on boosting the cell voltage of aqueous supercapacitors." Nano-Micro Letters, 2020, pp. 1-22.
Miao, L., et al. "Recent advances in carbon-based supercapacitors." Materials Advances, 2020, pp. 945-966.
Landi, G., et al. "A Comparative Evaluation of Sustainable Binders for Environmentally Friendly Carbon-Based Supercapacitors." Nanomaterials, 2021, V. 12, No. 1, pp. 46.

\* cited by examiner

SECONDARY CARBON BATTERY

FIELD OF THE INVENTION

The present invention is directed toward novel secondary carbon batteries comprising only environmentally benign porous carbon, water and salt. Charge-discharge cycle in these batteries relies in part on the reversible electrochemical redox reactions on the surface of porous carbon electrodes, as well as capacitance and pseudo-capacitance of these electrodes.

BACKGROUND OF THE INVENTION

The major drawback of the secondary carbon batteries with water-based electrolytes is self-discharge at elevated voltages. Above certain voltage, the batteries operate in the thermodynamically unstable region, which results in slow evolution of hydrogen on the negative electrode. According to the recent publication, self-discharge on the positive electrode is more complex, and entails evolution of carbon oxides due to partial oxidative degradation of the carbon electrode material (see, for example, He, Minglong, et al. "Ageing phenomena in high-voltage aqueous supercapacitors investigated by in situ gas analysis. "*Energy & Environmental Science* (2016): 623-633).

One of the techniques to improve the capacity and operating voltage of the carbon batteries with water-based electrolytes is surface modification of the electrodes. A variety of surface chemical treatment methods were proposed to improve the performance of the carbon batteries. However, the effects of such treatments on the self-discharge rates were uneven. For example, oxidation of porous carbon electrodes with ammonium persulfate resulted in an increase of a capacity, but also produced a notable increase of the self-discharge rates (see, for example, Kopczyński, Kacper, et al. "Persulfate treatment as a method of modifying carbon electrode material for aqueous electrochemical capacitors." *Journal of Solid State Electrochemistry* 21(4) (2017): 1079-1088). Somewhat better results were achieved with alkaline washing followed by the nitric acid treatment. This method, disclosed in the U.S. Pat. No. 7,119,047, allows substantial improvement of both the capacity and the self-discharge rate of the carbon batteries.

Another method to reduce the self-discharge rate and to improve the stability of carbon batteries involves adjustment of the relative sizes of positive and negative electrodes. As noted previously, the positive electrodes in these batteries are more prone for oxidative degradation compared to the negative electrodes. Increasing relative size of these positive electrodes lowers their voltage and protects them from harmful oxidizing stress at the highest points of the charge-discharge cycle. This idea is implemented in one of the examples presented in the U.S. Pat. No. 6,706,079.

Further opportunity to improve the performance of the negative electrodes in the carbon batteries entails application of a constant electric current through the battery at the optimal voltage until the current drops to a low pre-determined range. During this pre-treatment, the negative electrode surface undergoes electrochemical reduction, which reduces the kinetics of hydrogen evolution due to electrochemical water decomposition. This method of electrochemical reductive pre-treatment is disclosed in the U.S. Pat. No. 6,706,079.

Several other approaches aiming at the reduction of the undesirable self-discharge in carbon batteries were also explored. The most effective approach is related to the careful choice of an aqueous electrolyte. Early examples of carbon batteries, starting with the original discovery described in the U.S. Pat. No. 2,800,616A, employ acidic electrolytes. Subsequent research demonstrated that good results can be attained with alkaline electrolytes, such as concentrated solutions of KOH (see, for example, the U.S. Pat. No. 3,652,902). However, recent studies indicated that the highest operating voltages, in some instances above 2.0 V, could be achieved in neutral salt solutions (see, for example, Gou, Qianzhi, et al. "Recent advances on boosting the cell voltage of aqueous supercapacitors." *Nano-Micro Letters* (2020): 1-22). Chemical composition of these neutral salts also affects the performance of these carbon batteries. Various inorganic salts were investigated as electrolyte components, including sulfates, such as $Li_2SO_4$, $Na_2SO_4$ and $K_2SO_4$. Other salts, such as acetates (LiOAc, NaOAc, KOAc), nitrates ($LiNO_3$, $KNO_3$) and perchlorates ($NaClO_4$) were also explored. The best results were obtained with $Li_2SO_4$, which allowed for achieving an operating voltage as high as 2.2 V. Further improvements of aqueous carbon battery performance can be attained with redox additives, such as KI, KBr, or HBr, as described in the U.S. Pat. No. 4,713,731A. Variations of pH were explored in the U.S. Pat. No. 4,622,611A. To achieve the desired pH values, hydrophosphates and hydrosulfates were used, such as $NaH_2PO_4$, $K_2HPO_4$, or $KHSO_4$. However, neutral solutions of $Li_2SO_4$ provided the best results.

Another actively explored technology of the self-discharge reduction is related to the use of so-called water-in-salt concept, which utilizes super-concentrated (>10M) salt solutions. In these water-in-salt electrolytes, the electrochemical dissociation of water is suppressed due to the low concentration of water (typically less than 50% by weight), and high level of coordination of the remaining water around cationic and anionic species in the electrolyte (see, for example Miao, Ling, et al. "Recent advances in carbon-based supercapacitors. "Materials Advances (2020): 945-966). The disadvantages of this approach are related to a relatively low conductivity of these water-in-salt solutions, and the necessity of using special highly soluble salts.

From the environmental perspectives, solutions of common metal chlorides, such as NaCl, KCl, $MgCl_2$ or $CaCl_2$), are clearly preferred as water-based electrolytes due to their widespread availability, low cost, and low toxicity. However, inorganic chloride solutions are rarely explored as electrolytes in carbon batteries due to the expected chlorine gas liberation from the positive electrodes at elevated voltages. Existing examples include research systems employing diluted solutions of NaCl and operating at low voltages below 1.0 V (see, for example, Landi, Giovanni, et al. "A Comparative Evaluation of Sustainable Binders for Environmentally Friendly Carbon-Based Supercapacitors." *Nanomaterials* 12.1 (2021): 46). Similar experiments with table salt solutions as electrolytes were reported as ineffective in the U.S. Pat. No. 3,652,902. Also, a calcium chloride solution as an electrolyte was mentioned in the U.S. Pat. No. 4,622,611A as having poor performance. As a result, these systems lack practical utility as carbon batteries.

The most closely related to the current inventive device is a supercapacitor system described in the U.S. Pat. No. 8,451,585. In the preferred embodiment, this supercapacitor utilizes activated carbon electrodes immersed in the saturated aqueous solution of NaCl as the electrolyte. The described supercapacitor can be charged up to 1.3 V. However, this voltage is too low for full utilization of faradic charge-discharge processes related to the electrochemical dissociation of water, and therefore this system cannot be effectively used as a carbon battery.

SUMMARY OF THE INVENTION

This invention pertains to a novel secondary carbon battery employing porous carbon electrodes immersed in a concentrated brine electrolyte. In the preferred embodiments, the porous carbon electrodes comprise activated carbon, and the brine electrolyte comprises binary and ternary eutectic aqueous solutions of NaCl, KCl, $MgCl_2$, $CaCl_2$), and mixtures thereof. Further improvement of the carbon battery can be achieved by a repetitive charge-discharge cycling at elevated voltage and subsequent replacement of the spent electrolyte with the fresh electrolyte. Novel secondary carbon batteries with the operating voltage of up to 1.85 V can be used as components of renewable energy storage devices and other applications.

DETAILED DESCRIPTION OF THE INVENTION

Figure 1:
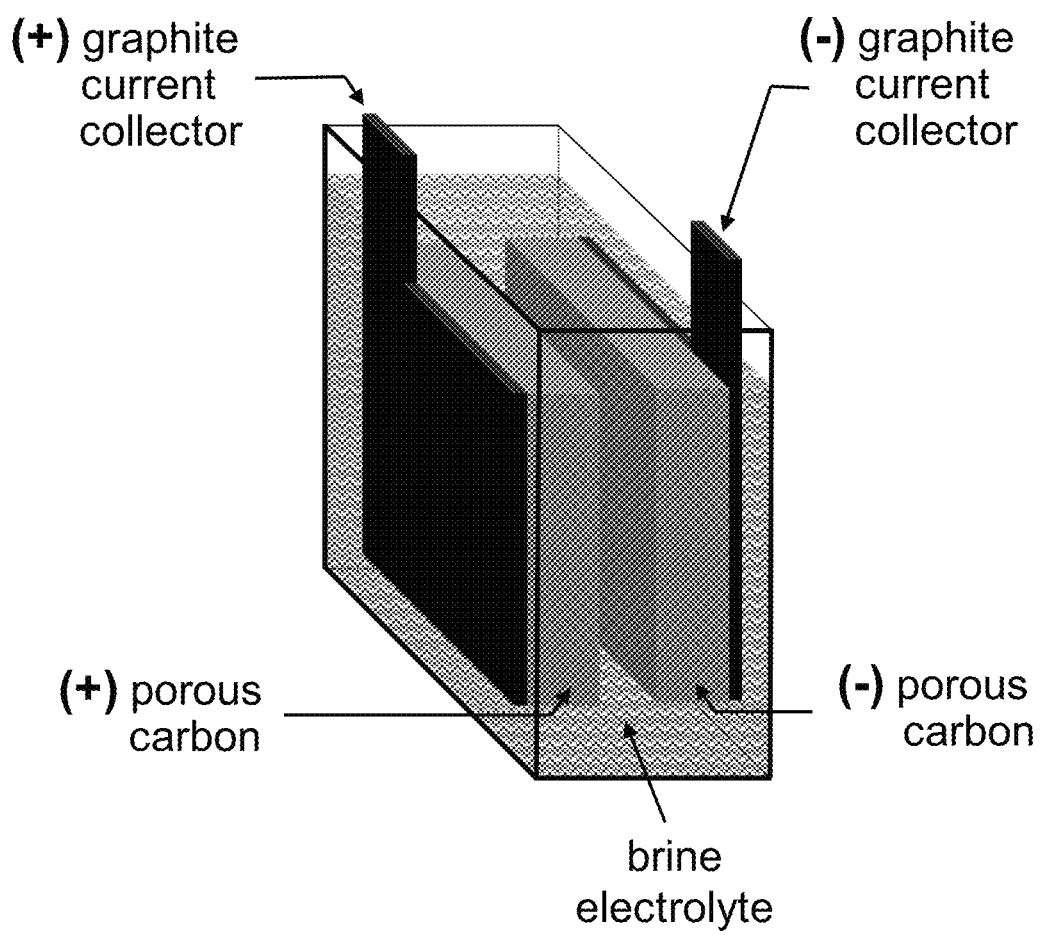
FIG. 1 is a schematic representation of the secondary carbon battery.

The original concept of secondary carbon batteries was originally envisioned more than 70 years ago during the development of the first supercapacitors. The initial patent in this area, U.S. Pat. No. 2,800,616A. describes a low voltage battery that comprises two porous carbon electrodes immersed in acidic water electrolyte. Subsequent research by the inventor revealed that these carbon batteries with water-based electrolytes are actually hybrid systems employing both capacitance and faradic electrochemical dissociation of water for energy storage. Above the threshold voltage, typically above the thermodynamic stability of water at 1.23 V, hydrogen is being accumulated on the negative porous carbon electrode via physical and chemical sorption. Similarly, oxygen is being accumulated on the positive electrode. In addition to the improved capacity, partial electrochemical dissociation of water increases pH of the negative electrode and decreases pH of the positive electrode. This, in turn, improves the maximum working voltage of the secondary carbon battery due to the well-known pH-dependence of electrochemical dissociation of water according to the Nernst equation. The overall surface electrochemical reactions during the charge-discharge cycle of the carbon batteries are presented in Scheme 1.

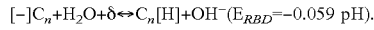

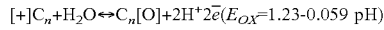

Scheme 1. Electrochemical reactions on the electrode surfaces of the carbon batteries with aqueous electrolytes.

It has been unexpectedly discovered in the present invention that secondary carbon batteries employing brine electrolytes can be charged above 2.0 V without evolution of chlorine at a positive electrode. Subsequently, it was further discovered that self-discharge rates of these carbon batteries could be substantially reduced by repeated cycling at elevated voltages with subsequent replacement of the spent electrolyte with the fresh electrolyte. The enhanced operating voltage of these improved carbon batteries allows for a substantial improvement of their performance as energy storage devices.

The composition of the brine electrolyte is the primary factor affecting the performance of carbon batteries. Among tested brine solutions of NaCl, KCl, $MgCl_2$, and $CaCl_2$), good results were achieved with concentrations between 15-25% for NaCl and KCl, 20-30% for $MgCl_2$, and 20-40% for $CaCl_2$). Mixed salt brine solutions, such as NaCl—KCl solutions with total salt concentrations between 15-25%, are also effective as electrolytes for carbon batteries.

Of particular importance are eutectic electrolyte compositions for low temperature operations. The preferred embodiments include the eutectic water-based electrolytes containing 23.3% of NaCl with the freezing point of about −21.1° C.; or 21.6% of $MgCl_2$ with the freezing point of about −33° C.; or 30.3% of $CaCl_2$) with the freezing point of about −50° C. The eutectic solution of KCl in water is less desirable due to a relatively high freezing point (about −10.6° C. for 19.7% solution). In this case, the preferred embodiments also include the ternary eutectic electrolyte containing 5.8% of KCl and 20.2% NaCl with the freezing point of about −22.9° C.

The composition of material for current collectors also affects the battery performance. Among other materials tested, graphite current collectors provide the best results. Similar observations were noted in the U.S. Pat. No. 6,706,079. In our experiments, metal current collectors, while providing a lower resistance, substantially increase self-discharge rates of the carbon batteries. Various shapes of graphite current collectors can be used, but the best results were achieved with the plate electrodes, as depicted in FIG. 1. The thickness of the graphite current collectors can be between 2 and 7 mm, preferably 3-4 mm to achieve the best balance between the weight and mechanical strength.

The quality of porous carbon is another parameter affecting the overall effectiveness of carbon batteries. Our experiments demonstrated that the inexpensive and widely available activated carbon can be successfully used for the construction of porous carbon electrodes. Good results were achieved with activated carbons having a surface area of about 1500 $m^2/g$. In general, commercial activated carbons with a surface area of 1000-2000 $m^2/g$ are acceptable as electrode materials without any pre-treatment. A negative effect of minor quantities of impurities found in these commercial samples can be mitigated during the battery improvement process outlined further below.

Figure 2:
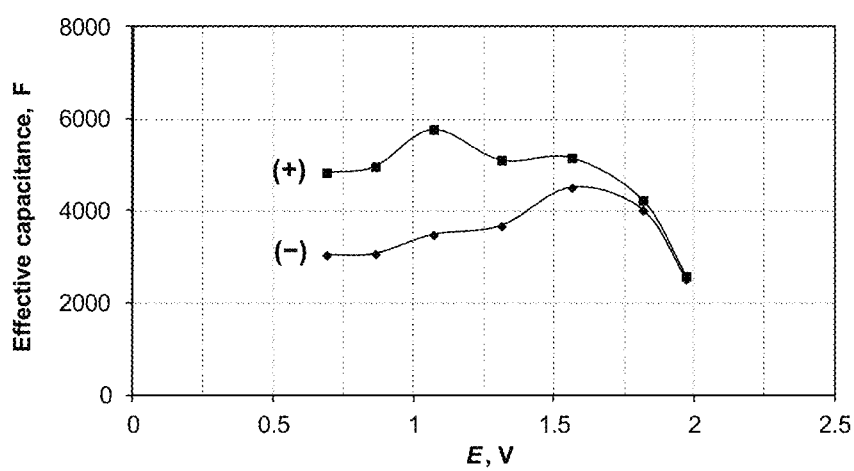
FIG. 2 shows separate positive (+) and negative (−) electrode contributions towards the total effective capacitance of the carbon battery with the eutectic NaCl electrolyte and equal-weight activated carbon electrodes.

Utilization of porous carbon electrodes with different weights provides additional benefits. Positive and negative electrodes perform differently in carbon batteries. The positive electrode is more efficient and has a higher effective capacitance compared to the negative electrode, other parameters being equal. At the same time, the maximum faradic contribution towards the capacitance of the negative electrode occurs at a higher voltage compared to the positive electrode (FIG. 2). Another factor is the self-discharge rate, which is relatively higher for the negative electrode than for the positive electrode. Yet another factor is overcharge stability of the electrodes, which is higher for the negative electrode and lower for the positive electrode. As a result, carbon batteries with larger negative electrodes and smaller positive electrodes have slightly higher maximum energy densities, and lower self-discharge rates. At the same time, carbon batteries with larger positive electrodes and smaller negative electrodes have better electrode stability. The weight ratio between the positive and negative electrodes for the unsymmetrical carbon batteries can be between 7:3 to 3:7. In the preferred embodiments, this ratio is between 2:3 to 3:2.

Figure 3:
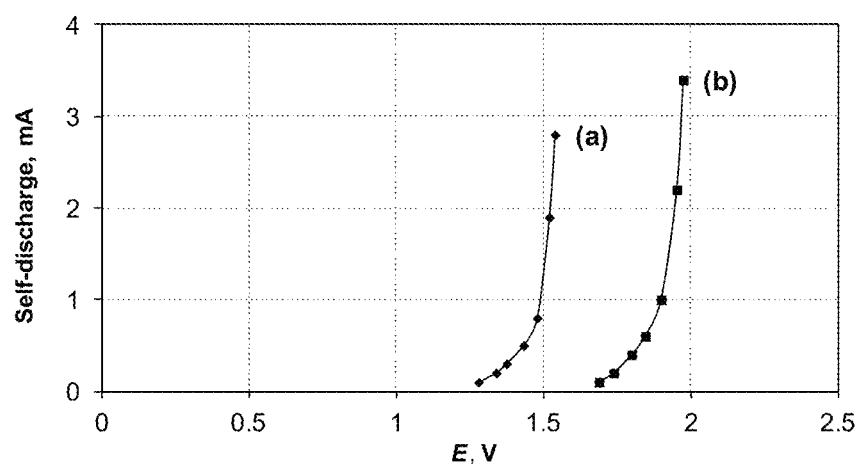
FIG. 3 represents typical self-discharge curves of secondary carbon batteries with the eutectic NaCl electrolyte before (a) and after (b) the initial cycling improvement.

The improvement of carbon batteries, which allows for attaining a substantially higher operating voltage and increases their energy density, is achieved through special steps in their fabrication. These steps include repetitive initial charge-discharge cycles followed by subsequent removal of the contaminated electrolyte with the precipitate and re-filling of the battery with the fresh electrolyte. During these initial charge-discharge cycles, small amounts of impurities from the porous carbon electrodes are leached into the electrolyte. Subsequent removal of the electrolyte and precipitate yields a clean carbon battery with improved performance. The best results were achieved with 2-7 initial charge-discharge cycles between lowered 0.2-0.4 V and elevated 1.9-2.1 V employing 0.05-0.25 C constant current. In the preferred embodiments, the improvements are made by employing five charge-discharge cycles between 0.3 V and 2.0 volts using 0.1-0.2 C constant current. The maximum operating voltage of the improved carbon batteries can reach 1.75-1.85 V compared to 1.45-1.55 V for non-improved batteries, measured at the self-discharge rate of less than 1% per day (see FIG. 3).

In the preferred embodiments (see examples 1-67), the inventive secondary carbon batteries comprise graphite current collectors, activated carbon electrodes, and binary or ternary aqueous eutectic solutions of NaCl, KCl, $MgCl_2$, and $CaCl_2$) as electrolytes. The improvement of the carbon batteries is achieved by the repetitive charger-discharge cycling followed by removal of the spent electrolyte together with leached impurities and the precipitate, and replacement of the spent electrolyte with the fresh one. The carbon batteries performance was tested at room temperatures, 19-21° C.

EXAMPLE 1. The secondary carbon battery (FIG. 1), equipped with two 5×8 cm graphite current collectors (3 mm thickness) and two 5×8 cm carbon electrodes (1.5 cm thickness) made of activated carbon tablets (45 g each), and a container, was filled with 150 ml of the eutectic solution of NaCl in distilled water. The battery was charged using a constant 100 mA current to 1.6 V at 20° C. The charged battery showed the following characteristics: internal resistance—0.42Ω, capacity—907 mAh. The maximum working voltage of the battery with less than 1% per day self-discharge rate was 1.52 V.

EXAMPLE 2. The same as the example 1, but the eutectic solution of $MgCl_2$ in distilled water was used as the electrolyte. The battery was charged using a constant 90 mA current to 1.6 V at 21° C. The charged battery showed the following characteristics: internal resistance—0.61Ω, capacity—863 mAh. The maximum working voltage of the battery with less than 1% per day self-discharge rate was 1.41 V.

EXAMPLE 3. The same as the example 1, but the eutectic solution of $CaCl_2$) in distilled water was used as the electrolyte. The battery was charged using a constant 100 mA current to 1.6 V at 20° C. The charged battery showed the following characteristics: internal resistance—0.57Ω, capacity—886 mAh. The maximum working voltage with less than 1% per day self-discharge rate was 1.47 V.

EXAMPLE 4. The same as the example 1, but the eutectic solution of KCl in distilled water was used as the electrolyte. The battery was charged using a constant 100 mA current to 1.6 V at 20° C. The charged battery showed the following characteristics: internal resistance—0.36Ω, capacity—912 mAh. The maximum working voltage with less than 1% per day self-discharge rate was 1.51 V.

EXAMPLE 5. The same as the example 1, but the ternary eutectic solution of KCl-NaCl in distilled water was used as the electrolyte. The battery was charged using a constant 100 mA current to 1.6 V at 20° C. The charged battery showed the following characteristics: internal resistance—0.38Ω, capacity—908 mAh. The maximum working voltage with less than 1% per day self-discharge rate was 1.51 V.

EXAMPLE 6. The same as the example 1, but the weight of the positive electrode was reduced to 40 g (approximately 1.4 cm thickness) and the weight of the negative electrode was increased to 50 g (approximately 1.6 cm thickness). The battery was charged using a constant 100 mA current to 1.6 V at 20° C. The charged battery showed the following characteristics: internal resistance—0.41Ω, capacity—923 mAh. The maximum working voltage with less than 1% per day self-discharge rate was 1.56 V.

EXAMPLE 7. The same as the example 1, but the battery was cycled five times between 2.0 V and 0.3 V using a constant 120 mA current for charging and a constant 120 mA current for discharging. The spent electrolyte and the precipitate were removed, and then were replaced with the fresh electrolyte (the eutectic solution of NaCl in distilled water). The battery was charged using a constant 120 mA current to 1.9 V at 19° C. The charged battery showed the following characteristics: internal resistance—0.44Ω, capacity—1036 mAh. The maximum working voltage with less than 1% per day self-discharge rate was 1.83 V.

Thus, the inventive carbon batteries have several similar elements outlined below.

All disclosed carbon batteries comprise:
i) a container;
ii) two current collectors comprising graphite;
iii) two electrodes comprising porous carbon wherein in the preferred embodiments:
porous carbon is activated carbon;
the weight ratio of porous carbon in the positive electrode versus porous carbon in the negative electrode is between 3:2 and 2:3;
iv) the water-based brine electrolytes wherein in the preferred embodiments:
the water-based brine electrolyte comprising soluble inorganic chlorides selected from the group consisting of NaCl, KCl, $MgCl_2$, $CaCl_2$), and mixtures thereof;
the concentrations of salts in the brine electrolytes correspond to the binary and tertiary eutectic solutions of NaCl, KCl, $MgCl_2$, and $CaCl_2$) in water.

The performance of the disclosed carbon batteries can be improved by the repetitive initial charge-discharge cycling followed by removal of the spent electrolyte and precipitate, and re-filling of the batteries with the fresh electrolyte wherein in the preferred embodiments:
i) The initial charge-discharge cycle is repeated 3-7 times;
ii) The maximum charge voltage of the battery is set to 1.9-2.1 Volts, and the minimum discharge voltage of the battery is set to 0.2-0.4 Volts;

iii) The initial charge-discharge current is set to 0.1-0.2 C.

The invention claimed is:

1. A secondary carbon battery comprising only:
   two graphite current collectors;
   two electrodes comprising porous carbon, where a negative electrode comprising porous carbon has accumulated hydrogen and a positive electrode comprising porous carbon has accumulated oxygen; and
   a water-based brine electrolyte, comprising chloride ions.

2. The secondary carbon battery of claim 1, wherein the porous carbon is activated carbon with a surface area between 1000 and 2000 $m^2/g$.

3. The secondary carbon battery of claim 1, wherein a weight ratio of the two electrodes comprising porous carbon is between 2:3 and 3:2.

4. The secondary carbon battery of claim 1, wherein the water-based brine electrolyte is an aqueous solution of soluble chlorides selected from a group consisting of NaCl, KCl, $MgCl_2$, $CaCl_2$), and mixtures thereof.

5. The secondary carbon battery of claim 1, wherein the water-based brine electrolyte is a binary eutectic aqueous solution of one soluble chloride selected from a group consisting of NaCl, KCl, $MgCl_2$, $CaCl_2$.

6. The secondary carbon battery of claim 1, wherein the water-based brine electrolyte is a ternary eutectic aqueous solution of two soluble chlorides selected from a group consisting of NaCl, KCl, $MgCl_2$, $CaCl_2$.

* * * * *